United States Patent [19]

Rancoulle

[11] Patent Number: 4,951,852

[45] Date of Patent: Aug. 28, 1990

[54] INSULATIVE COATING FOR REFRACTORY BODIES

[76] Inventor: Gilbert Rancoulle, 54 Vauban A. Route de Mons, 59600 Maubeuge, France

[21] Appl. No.: 210,580

[22] Filed: Jun. 23, 1988

[51] Int. Cl.$^5$ .................. C23C 26/00; B22D 41/00
[52] U.S. Cl. ............................ 222/591; 222/600; 427/443.2; 428/446; 428/689; 428/699; 501/133; 501/95
[58] Field of Search ............... 427/443.2; 428/446, 428/689, 699; 222/591, 600; 501/133, 95

[56] References Cited

U.S. PATENT DOCUMENTS

| | | | |
|---|---|---|---|
| 2,268,279 | 12/1941 | Debenham | 222/591 |
| 2,948,032 | 8/1960 | Reuter | 501/133 |
| 2,991,200 | 7/1961 | Sheridan et al. | |
| 3,013,897 | 12/1961 | Cupery et al. | |
| 3,429,486 | 2/1969 | Cope | 222/591 |
| 3,840,394 | 10/1974 | Eppler | 428/446 |
| 3,931,447 | 1/1976 | Grisaffe | 428/689 |
| 4,020,234 | 4/1977 | Gardner | 428/446 |
| 4,041,199 | 8/1977 | Cartwright | 428/446 |
| 4,319,925 | 3/1982 | Brown | 106/164 |
| 4,331,773 | 5/1982 | Hongo | 501/89 |
| 4,342,597 | 8/1982 | Brown | 106/501 |
| 4,487,841 | 12/1984 | Bartuska et al. | 501/106 |
| 4,492,766 | 1/1985 | Zverina et al. | 501/106 |
| 4,528,244 | 7/1985 | Winkelbauer et al. | 428/106 |
| 4,547,403 | 10/1985 | Smith | 106/427 |
| 4,595,665 | 6/1986 | Takayama | 428/699 |
| 4,608,087 | 8/1986 | Yoshino | 106/18.12 |
| 4,624,898 | 11/1986 | Moore | 428/446 |
| 4,656,146 | 4/1987 | Schlett | 501/133 |
| 4,767,672 | 8/1988 | Fujinaka | 428/446 |
| 4,792,070 | 12/1988 | Daussan | 229/591 |

FOREIGN PATENT DOCUMENTS 41476 3/1984 Japan .................. 428/689

Primary Examiner—Shrive Beck
Assistant Examiner—Vi Duong Dang
Attorney, Agent, or Firm—Webb, Burden, Ziesenheim & Webb

[57] ABSTRACT

An insulative coating for the thermal protection of ceramic refractory bodies, such as submerged pouring nozzles, and like pieces used in continuous casting of molten steel and other metals. The coating is prepared as a slurry having a preferred composition comprising (by weight %) fused silica grains (30–85%); ceramic fibers (0–10%); binders (0–7%); frits (0–40%); and water (15–30%). A refractory body, which preferably has a previously applied anti-oxidation glaze thereon, is employed at either ambient temperature or preheated to a temperature within the range of about 70°–120° C., and dipped into the slurry composition for a controlled time period of between 5 to 60 seconds to achieve a desired coating thickness of between about 1 to 6 mm. The coated refractory body is then dried and ready for service. Pouring nozzles coated with the insulative compositon may be used in a cold start-up continuous casting mode without the need for preheating.

7 Claims, No Drawings

INSULATIVE COATING FOR REFRACTORY BODIES

BACKGROUND OF THE INVENTION

The present invention relates generally to refractory components used in casting molten metal and, more particularly, to thermal insulative coatings for protecting such refractory components and to enhance their performance while prolonging their service lives.

The insulative coating of the present invention is particularly suited for use on a variety of refractory bodies, such as submerged pouring nozzles, ladle to tundish shroud tubes and like consumable components used in the continuous casting of metals, such as molten steel. Heretofore, in order to protect submerged pouring nozzles, shroud tubes and the like from the thermal shock experienced during start-up of a continuous casting run, it has been common practice to prepare the nozzle in some manner in order to minimize the thermal shock caused by a cold nozzle start-up. One common practice has been to preheat the pouring nozzles prior to casting. Another common expedient to protect against the thermal shock of start-up has been the application of a ceramic fiber-impregnated insulative paper product around the outside of the pouring nozzle. The paper product, while somewhat effective in minimizing thermal shock and resultant cracking problems, is expensive due to the cutting, wrapping and wiring required to size and properly fit the paper sheet around the exterior surface of the refractory nozzle. Of course, the paper coating is not applied to the interior cavities of the nozzle.

In addition to the thermal shock problems, prior pouring nozzles employed in continuous casting operations also experience bridging or freezing of metal between the submerged nozzle and the adjacent walls of the water cooled continuous casting mold. The aforementioned preheating or paper wrapping operations tend to minimize such objectionable bridging, however, all problems are not solved. For example, in the case of the wrapped nozzle, there is an internal build-up of frozen metal due to the fact that the interior of the nozzle has no insulative protection.

The present invention solves many of the time-consuming and expensive problems heretofore encountered in the preparation and use of submerged pouring nozzles and like components used in continuous steel casting operations. The present invention provides an insulative coating for such pouring nozzles and the like which eliminates the need to preheat the nozzle. The coating of the present invention prevents undesirable thermal shock in the nozzle body during start-up and also eliminates unwanted bridging or freezing between the nozzle and the mold during casting. The insulative coating of the invention also covers the interior bore of the pouring nozzle to provide insulation therewithin which prevents unwanted build-up of frozen metal within the nozzle bore during casting.

SUMMARY OF THE INVENTION

Briefly stated, the present invention provides a thermal insulative coating for a refractory body exposed to molten metals, such as submerged pouring nozzles used in the continuous casting of steel. The insulative coating is preferably applied to both the exterior and interior surfaces of the refractory body as a slurry, preferably by dipping. A preferred slurry coating composition of the invention consists essentially of:

| Ingredient | Weight % |
| --- | --- |
| Fused silica grains | 30–85% |
| Ceramic fibers | 0–10% |
| Water | 15–30% |
| Binders | 0–7% |
| Frits | 0–40% |

The coefficient of thermal expansion of the coating can be altered to simulate that of the refractory substrate by substituting one or more ceramic materials for the fused silica grains in the above preferred slurry composition. Suitable substitute ceramic materials include alumina powder, zirconia powder, mullite powder and alumina bubbles.

In a preferred form of the invention, a continuous casting nozzle or like component, of a conventional refractory material such as alumina graphite, for example, is dip coated with the above fused silica refractory slurry composition at a controlled time of between about 5 to 60 seconds. The refractory body is preferably glazed and may be at ambient temperature or preheated to a temperature of between about 70°–120° C. prior to dipping to obtain an insulative coating thickness of between about 1 to 6 mm. A preferred coating thickness is about 3 mm. After an appropriate drying time, the coated refractory body is ready for use. The coating has a relatively hard surface in the dried state and is suitable to withstand the rough handling expected in a mill environment.

DETAILED DESCRIPTION OF THE INVENTION

A slurry of the insulative coating composition is prepared by first forming a ceramic slip, preferably consisting essentially of a major portion of fused silica ($SiO_2$) grains (30–85% by weight) plus water (15–30% by weight). The fused silica grains, preferably obtained by an atomized process, are in a fine powder state, having a particle size preferably less than 100 mesh sieve size. The $SiO_2$ particles are completely deflocculated in the slip prior to making the slurry. The fine particle size of the fused silica powder results in a very fast reaction so as to achieve the desired rapid deflocculation in the slip. The apparent specific gravity (ASG) of the slip should be controlled within a range of about 1.700 to 2.000 grams per cubic centimeter. The viscosity should also preferably be controlled between a range of about 0.3 to 0.5 pa second, using an LV model Brookfield viscometer with a #1 spindle at 12 rpm. Other ceramic materials may be partially or wholly substituted to dilute to replace the fused silica ingredient, such materials which may be used include: alumina powder, zirconia powder, mullite powder and alumina bubbles. Fused silica has very low coefficients of thermal expansion and thermal conductivity and, hence, is an excellent material in most coating applications. In some applications, however, it may be desirable to increase the thermal expansion coefficient of the coating or other properties to more closely match that of the refractory body substrate. In such instances, the above-mentioned diluting ceramic powders may be employed in the slurry in a manner well known to those skilled in the art.

The coating composition of the present invention also preferably includes an addition of up to 10% by weight of ceramic fibers which are added to the slurry mixture. A preferred ceramic fiber which may be used is a commercially available and relatively inexpensive, alumina-silica fiber, having a typical diameter of between 1–5 microns and a length of between about 1–10 millimeters. The chemical composition, the size and/or the specific type of ceramic fibers are not, in themselves, considered critical to the invention, but the presence of the ceramic fibers is important in order to increase the green strength of the coating. Other materials which may be substituted for the alumina-silica ceramic fibers, are materials such as, zirconia fibers, titania fibers, silicon carbide and alumina fibers. Commercially available alumina bubbles and zirconia bubbles are also suitable substitutes for the ceramic fibers and these not only impart additional strength to the green coating but also improve the thermal insulation characteristics of the coating due to the trapped air spaces contained within their hollow shells.

As stated above, the slurry is prepared by mixing the fine fused silica powder with water to obtain complete deflocculation, or dispersion of the slip. The ceramic fibers are then added. Good results are obtained by using a paddle-type mixer, such as a Zyklos mixer. Binders in an amount of up to about 7% by weight are also preferably added to the slurry. Binders such as Glass H, sodium silicate, or acrylic resins may be employed to impart hardenability, i.e., hardness and toughness, to the coating. If too much binder is added to the coating composition, there is an undesirable decrease in the refractoriness of the product.

The slurry composition also preferably contains a glass-forming frit material to impart some degree of pyroplasticity to the coating during high temperature use. Frits are well known, and are mixtures of oxide materials having glassy phases which undergo softening at specific temperature ranges and serve to fill any shrinkage cracks which might form in the coating due to sintering as the temperature increases.

After the slurry coating has been applied to the surface of the refractory body and has been dried, the coated refractory can be handled in a normal manner without damaging the coating. In the dried state a preferred coating composition consists essentially of:

| Ingredient | Weight % |
| --- | --- |
| Fused Silica* | about 45 to 100% |
| Ceramic fibers | 0 to about 10% |
| Binders | 0 to about 7% |
| Frits | 0 to about 40% |

EXAMPLE NO. 1

Five conventional alumina graphite refractory pouring tubes of the type used in continuous steel casting were dipped in a slurry of the following composition: 72% by weight fused silica grains less than 100 mesh, 5% by weight alumina-silica ceramic fibers and 23% by weight water. The tubes were first given a conventional antioxidation glaze and then preheated to a temperature in the range of 70° to 120° C. The table below shows the effect of preheated temperature versus immersion time on coating thickness.

TABLE

| Tube Temperature | Coating Thickness Immersion Time (seconds): | | |
| --- | --- | --- | --- |
|  | 10 sec. | 20 sec. | 30 sec. |
| 100° C. | 2.0 mm | 2.5–3.5 mm | 4.0–5.0 mm |
| 60° C. | N/A | 1.0 mm | 2.0 mm |

The data in the above table indicate that higher tube temperature or increased dipping time results in a greater coating thickness. From trial tests it is observed that the thickness of the coating should preferably be between about 1 to 6 mm in order to be effective in preventing thermal shock and/or bridging between the nozzle and the mold sidewalls. The coating thickness is preferably about 3 mm, which, from the above table, is obtained when the tube is at a preheated temperature of about 100° C. and immersed in the slurry for a time period of about 20 seconds. The coating thickness is also controlled by the viscosity and water content of the slurry with greater thickness being obtained with increasing viscosity, at constant time and temperature. Dipping a tube at ambient temperature is also possible and is one of the preferred methods included within the scope of the present invention.

Of course, it will occur to those skilled in the art that methods other than dipping may be employed to apply the slurry coating to the refractory piece. Such alternative methods include spraying, brushing or casting of the slurry. The dipping method of applying the slurry is particularly suitable for coating refractory tubes, such as submerged pouring nozzles, since the inside surfaces of the tube bore may be coated along with the outside when the part is immersed in the slurry. The coating when applied to the inside of the bore provides a valuable insulation layer during cold start-up which prevents metal freezing within the nozzle bore and the resultant undesirable flow restrictions.

EXAMPLE NO. 2

Twenty-four conventional alumina graphite refractory submerged pouring nozzles were given an anti-oxidation glaze and then dip coated in a slurry prepared in accordance with the composition set forth in Example No. 1. The coating was 3 mm in thickness and after drying consisted essentially of about 93% by weight fused silica and about 7% by weight of alumina-silica ceramic fibers. Both exterior and interior surfaces of the nozzles were coated. The twenty-four nozzles were tested at a steel mill where freezing or bridging of steel between the pouring tube and water cooled continuous casting mold is a frequent problem. The casting trials with the twenty-four nozzles showed no freezing or bridging in any of the test nozzles coated in accordance with the invention.

EXAMPLE NO. 3

An additional fourteen conventional alumina graphite refractory submerged pouring nozzles were dip coated, both interior and exterior, with the same composition coating as the previously described test nozzles of Example Nos. 1 and 2. These pieces were tested to observe the effect of cold starting on a continuous casting nozzle. Normally, such conventional nozzles are preheated in the range of between 1,000°–2,000° C. to prevent thermal shock damage (cracking) to the nozzles. The fourteen coated test nozzles were each subjected to a cold casting start-up (no preheat) and all survived with no indication of damage due to thermal shock. In addition, there was no observable build-up of frozen metal within the internal diameter of any of these fourteen test pieces. No external oxidation of the carbon in the alumina graphite nozzle body was evident in any of the test pieces, further indicating the advantages of the coating of the present invention.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An article for use in casting molten metals and the like comprising a ceramic refractory body having upon its molten metal contacting surfaces an insulative coating, said coating, in a dry condition, consisting essentially of about 45 to about 100 weight % fused silica, 0 to about 10 weight % ceramic fibers, 0 to about 7 weight % binder, and 0 to about 40 weight % frits.

2. The article of claim 1 wherein the refractory body is a pouring nozzle and said insulative coating is present on exterior and interior surfaces of said pouring nozzle.

3. The article of claim 1 wherein the coating thickness is between about 1 mm to about 6 mm.

4. The article of claim 1 wherein the ceramic body is an alumina graphite nozzle for use in continuous casting of steel.

5. The article of claim 1 wherein the ceramic body also includes an anti-oxidation glaze surface interfacing said insulative coating.

6. The article of claim 5 wherein the insulative coating is about 3 mm in thickness.

7. The article of claim 1 wherein the fused silica portion of said insulative coating includes one or more ceramic materials partially or wholly substituted therefor, selected from the group consisting of alumina, zirconia and mullite.

* * * * *

UNITED STATES PATENT AND TRADEMARK OFFICE
CERTIFICATE OF CORRECTION

PATENT NO. : 4,951,852

DATED : August 28, 1990

INVENTOR(S) : Gilbert Rancoule

It is certified that error appears in the above-identified patent and that said Letters Patent is hereby corrected as shown below:

On the title page, under item [19], and in item [76] Inventor: "Rancoulle" should read --Rancoule--.

Column 1 Line 37 "experience" should read --experienced--.

Column 1 Line 41 "tend" should read --tended--.

Column 1 Line 42 "are" should read --were--.

Column 2 Line 54 "to" (second occurrence) should read --or--.

Column 2 Line 55 "ingredient, such" should read --ingredient. Such--.

Column 3 Line 55 insert --* as previously stated, the fused silica portion may also be partially replaced by alumina, zirconia and/or mullite.--.

Signed and Sealed this

Twenty-fifth Day of August, 1992

*Attest:*

DOUGLAS B. COMER

*Attesting Officer*   *Acting Commissioner of Patents and Trademarks*